(12) United States Patent
Kumazawa

(10) Patent No.: US 6,959,121 B2
(45) Date of Patent: Oct. 25, 2005

(54) DOCUMENT IMAGE PROCESSING DEVICE, DOCUMENT IMAGE PROCESSING METHOD, AND MEMORY MEDIUM

(75) Inventor: Yukio Kumazawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 593 days.

(21) Appl. No.: 09/917,766

(22) Filed: Jul. 31, 2001

(65) Prior Publication Data

US 2002/0025081 A1   Feb. 28, 2002

(30) Foreign Application Priority Data

Aug. 9, 2000   (JP) .............................. 2000-241492

(51) Int. Cl.⁷ .............................................. G06K 9/32
(52) U.S. Cl. ...................................... 382/294; 382/305
(58) Field of Search .............................. 382/173, 190, 382/195, 198, 201, 293, 295, 287, 286, 288, 382/289, 294, 306, 305, 184, 217, 216, 229; 715/517–523, 715/524, 788, 792, 793

(56) References Cited

U.S. PATENT DOCUMENTS

| | | | | |
|---|---|---|---|---|
| 4,985,930 A | * | 1/1991 | Takeda et al. | 382/306 |
| 5,093,653 A | * | 3/1992 | Ikehira | 345/657 |
| 5,185,821 A | * | 2/1993 | Yoda | 382/306 |
| 5,359,677 A | * | 10/1994 | Katsurada et al. | 382/290 |
| 5,446,803 A | * | 8/1995 | Kunitake et al. | 382/290 |
| 5,717,794 A | * | 2/1998 | Koga et al. | 382/309 |
| 6,333,997 B1 | * | 12/2001 | Hashiya et al. | 382/201 |

FOREIGN PATENT DOCUMENTS

| | | | | | |
|---|---|---|---|---|---|
| JP | 59041960 A | * | 3/1984 | | H04N 1/04 |
| JP | 11-120288 | | 4/1999 | | G06K 9/36 |
| JP | 11-282959 | | 10/1999 | | G06K 9/32 |

* cited by examiner

Primary Examiner—Bhavesh M. Mehta
Assistant Examiner—Dennis Rosario
(74) Attorney, Agent, or Firm—Morgan Lewis & Bockius LLP

(57) ABSTRACT

A document image processing device can correct the location of a document of an arbitrary format. The reference position of a document image is designated previously by a reference position designation unit. The document image is input per page and stored. A predetermined pixel block extraction unit extracts the predetermined pixel block appearing commonly on each page, and the coordinate value of the predetermined pixel block is supplied to a difference extraction unit. The difference extraction unit calculates the difference value between the position of the extracted predetermined pixel block and the reference position designated by the reference position designation unit, and supplies the difference value to an image shifting unit. The image shifting unit shifts the document image of that page based on the difference value, and corrects the location of the document image. The predetermined pixel block used for position correction can be set arbitrarily.

23 Claims, 17 Drawing Sheets

FIG. 2A
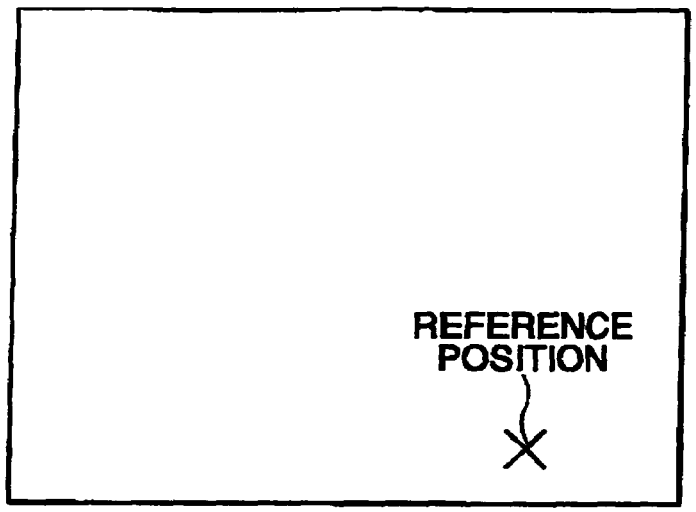
FIG. 2B
```
A B C D E F G H I J K. A B
C D E F G H I J K. A B C D
E F G H I J K. A B C D E F
G H I J K. A B C D E F G H
I J K. A B C D E F G H I J
K. A B C D E F G H I J K L
M N O P Q R S T U V W. A B
C D E F G H I J K. A B C D
E F G H I J K.
                        11
```
FIG. 2C
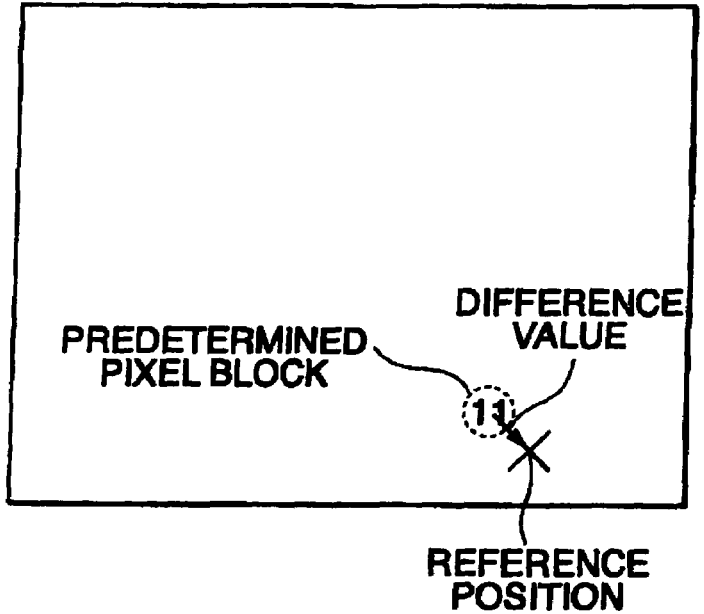

```
A B C D E F G H I J K . A B
C D E F G H I J K . A B C D
E F G H I J K . A B C D E F
G H I J K . A B C D E F G H
I J K . A B C D E F G H I J
K . A B C D E F G H I J K L
M N O P Q R S T U V W . A B
C D E F G H I J K . A B C D
E F G H I J K .
                              11
```

REFERENCE
POSITION

EXTRACTED PREDETERMINED
PIXEL BLOCK

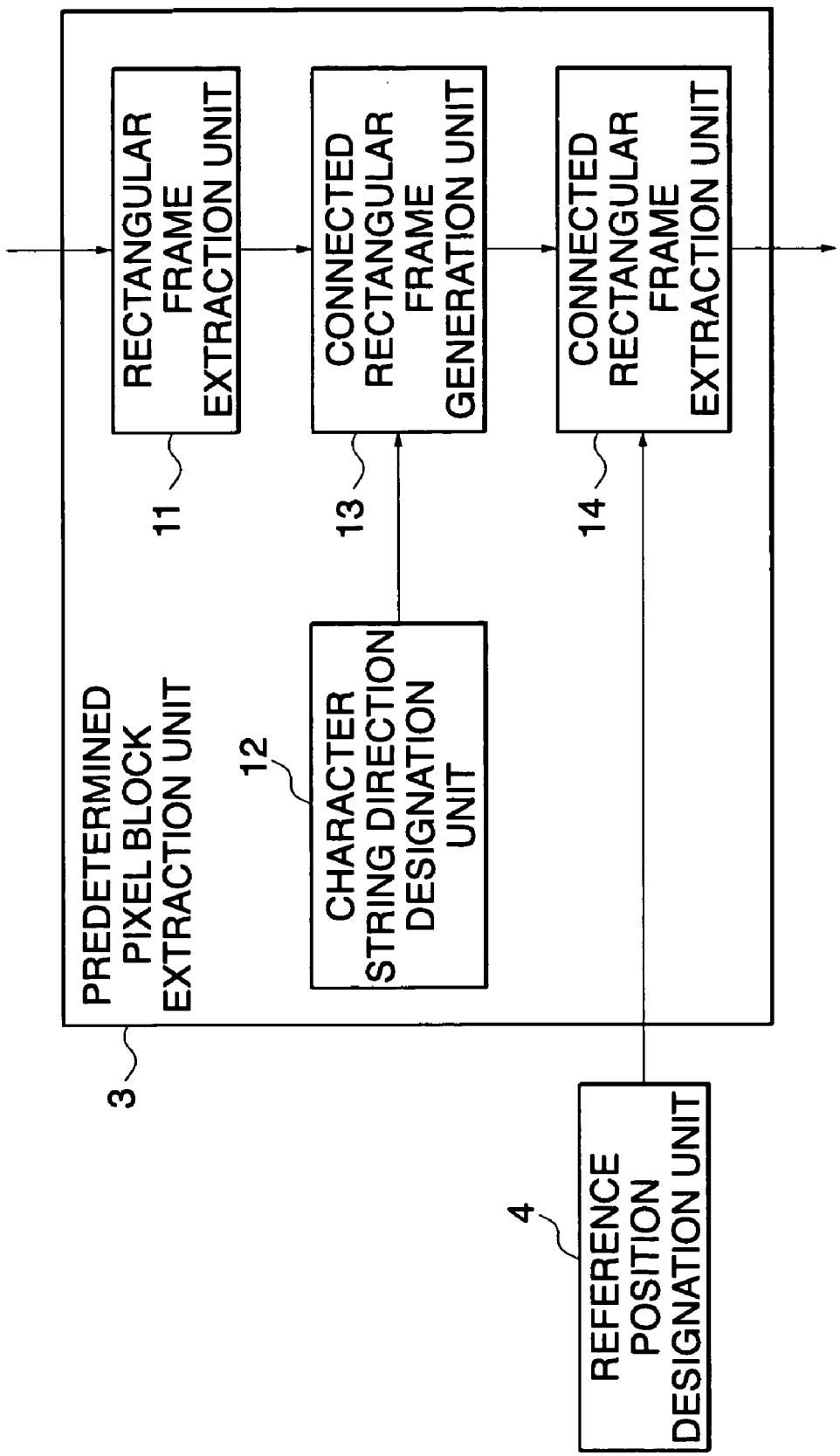

FIRST PAGE

SECOND PAGE n-TH PAGE

COMMON COMPONENT EXTRACTION RESULT

FIG. 14

| EVEN NUMBER PAGE | ODD NUMBER PAGE |
|---|---|
| A B C D E F G H I J<br>K. A B C D E F G H I<br>J K. A B C D E F G H<br>I J K. A B C D E F G<br>H I J K. A B C D E F<br>G H I J K. A B C D E<br>F G H I J K. A B C D<br>E F G H I J K. A B C | D E F G H I J K. A<br>B C D E F G H I J K.<br>A B C D E F G H I J<br>K. A B C D E F G H<br>I J K. A B C D E F G<br>H I J K. A B C D E F<br>G H I J K. |
| 14 | 15 |

FIG. 16A

| FILE NAME LIST | CHARACTER RECOGNITION RESULT |
|---|---|
| A | 1 |
| B | 2 |
| C | 3 |
| D | 4 |
| E | 5 |
| F | 6 |
| G | 7 |

FIG. 16B

| FILE NAME LIST | CHARACTER RECOGNITION RESULT |
|---|---|
| A | 1 |
| B | 2 |
| C | 3 |
| D | 4 |
| E | 5 |
| F | 6 |
| G | 7 |

DOCUMENT IMAGE PROCESSING DEVICE, DOCUMENT IMAGE PROCESSING METHOD, AND MEMORY MEDIUM

BACKGROUND OF THE INVENTION

1. Field of the Invention

This invention relates to a document image processing device and a document image processing method that are to be used for correcting the location of a document image, and a computer-readable memory medium in which a program to be run on a computer to perform such processing is stored.

2. Description of the Related Art

Systems in which a paper document is converted to electronic document by use of a scanner or the like, the electronic document is stored and managed in the form of various image file formats, and the stored document is visualized by use of a display device such as display or by use of an output device such as printer have been used widely. In some cases, a document image formed by use of a scanner that reads a paper document is located with deviation due to various causes depending on the setting of the paper document on the scanner or depending on the skew in feeding in the case where a document feeding type scanner is used.

In the case of the system in which the electronic document that has been converted from the paper document is stored and managed as described hereinabove, it is desirable that the document image is stored and managed in the best condition. In view of the above, various methods for correcting the locational deviation of the document image that has been read as described hereinabove to true up the location of the document images have been proposed.

For example, Japanese Published Unexamined Patent Application No. Hei 11-120288 discloses a method in which the position of the vertical line and horizontal line of a table is extracted with the run length of a black pixel to detect the locational deviation in the case where the document includes the table having ruled lines at the position to be served as the reference, and this method is an example of the conventional technique for correcting the locational deviation of an image. However, the document has to include the table having ruled lines, and this method cannot be applied to a document having no table and therefore cannot be used for detecting and correcting the locational deviation.

Furthermore, for example, Japanese Published Unexamined Patent Application No. Hei 11-282959 discloses a method in which the coordinate where the character string of the document of predetermined format is to be located is stored previously as the dictionary, the position of the string is detected from the input document image by the pixel projection method, and the deviation is detected based on the difference between the coordinate value in the dictionary and the coordinate value detected by the pixel projection method. However, this method requires much memory because the document image data should be multi-gradational. This method is applied only to the stylized document in which the position of characters and character strings are specified previously, and otherwise cannot detect and correct the locational deviation of the document. Because of the above, this method cannot be used for the application in which documents having different formats are stored and managed. Furthermore, the correction processing is interrupted when the character string is not detected, and the subsequent processing is not taken into consideration.

SUMMARY OF THE INVENTION

The present invention has been accomplished in view of the above circumstances, and provides a document image processing device used for correcting the location of a document of an arbitrary format. The present invention further provides a document image processing device and a document image processing method that makes a document, the location of which has not been corrected, easy to be handled later. Furthermore, the present invention provides a computer-readable recording medium in which a program to be run on a computer to perform such processing is stored.

In the present invention, a predetermined pixel block that appears commonly on at least some pages is extracted from input document images, and the location of a whole input document image is corrected so that the position of the extracted predetermined pixel block is located at the position coincident with the reference position or the position of the reference pixel block in the document image. As described hereinabove, the pixel block used when position correction is carried out may be the pixel block that appears commonly on at least some pages. Therefore, the required restriction that has been required conventionally, for example, a table on a document, is not required, and furthermore the fixed character string is not required. In the present invention, in a document of an arbitrary format, the location of the document image can be corrected so as to refer the reference position designated previously or the reference pixel block designated previously.

Differently from the case in which the predetermined pixel block is set previously, the layout of document images of plural pages to be processed is analyzed, and in the case where there is approximately the same pixel block at the same position in the document image of each page, this pixel block may be regarded as the predetermined pixel block. Furthermore, at that time the reference position is also determined or a user may designate the reference position. The location of the whole document image is corrected so that the position of the predetermined pixel block on the document image of each page is coincident with the reference position. As described hereinabove, the pixel block that appears commonly on document images is extracted automatically, and the location of the document images can be corrected with the reference of the pixel block.

In the case where the layout of the document is different between the right page and left page as in the case of a spread document, the reference position or position of the reference pixel block may be set for the left page and the right page respectively. Furthermore, if the document image of each page has been subjected to skew correction previously, then the predetermined pixel block is extracted easily and the document image without skew is obtained after location correction, and a good result is obtained. Furthermore, the page number of the input document image is recognized and the document image is sorted according to the page number order for output. In the case where the page number region is extracted as the predetermined pixel block particularly, it is possible to recognize the page of the document image by recognizing the character of the pixel block extracted for location correction.

If the predetermined pixel block cannot be extracted when the abovementioned location correction processing is performed, the location correction is impossible. In such a case, the information of the corresponding document image is recorded as an undetected log. After residual document images are subjected to location correction automatically except for the document image that cannot be subjected to location correction, the document image that cannot be subjected to location correction is notified to a user. The user corrects the location of only the document that cannot be subjected to location correction based on the recorded undetected log.

BRIEF DESCRIPTION OF THE DRAWINGS

Preferred embodiments of the present invention will be described in detail based on the followings, wherein:

FIG. 2A to FIG. 2C are diagrams illustrating an exemplary operation in the first embodiment of the present invention;

FIG. 5 is a block configuration diagram illustrating an exemplary predetermined pixel block extraction unit 3;

FIG. 14 is an explanatory diagram illustrating an exemplary document with layout different between an odd page and an even page;

FIG. 16A and FIG. 16B are explanatory diagrams illustrating an exemplary page sort;

DETAILED DESCRIPTION OF THE PREFERRED EMBODIMENTS

Figure 1:
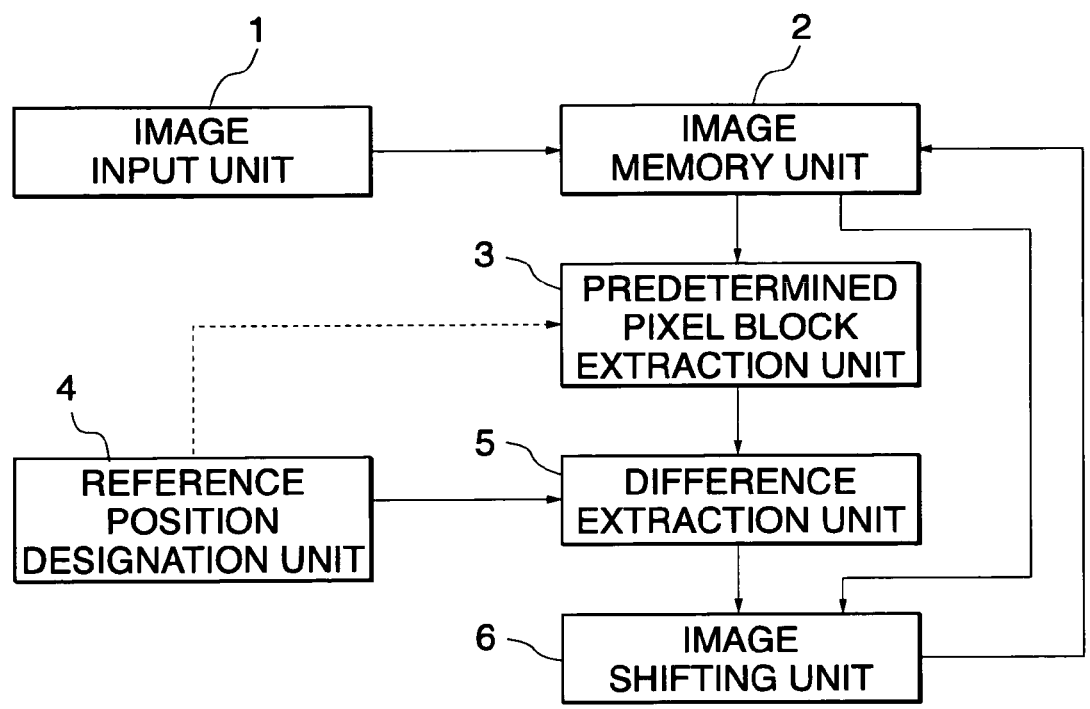
FIG. 1 is a block diagram illustrating the first embodiment of the present invention.

FIG. 1 is a block diagram illustrating the first embodiment of the present invention. 1 denotes an image input unit, 2 denotes an image memory unit, 3 denotes a predetermined pixel block extraction unit, 4 denotes a reference position designation unit, 5 denotes a difference extraction unit, and 6 denotes an image shifting unit. The image input unit 1 provided with an image reading unit such as a scanner reads an image on a document and generates a document image. As a matter of course, in the case where a document image is formed already as a file, the image input unit 1 may have a structure that reads a document image from a file. Furthermore, the image input unit 1 may have the structure that receives a document image transferred through a network, and in this case the image input unit 1 may be formed as an interface of the network. The image input unit 1 may be formed variously depending on the input type of the document image.

The image memory unit 2 holds a document image supplied from the image input unit 1 in page units. Furthermore, a document image that has been subjected to location correction processing is also stored in the image memory unit 2. As a matter of course, a document image that has been subjected to location correction processing may be held in another memory unit, or may be sent to the outside without holding in the image memory unit 2. Otherwise, the input document image may not be held in the image memory unit 2, or the image memory unit 2 itself may not be provided, if the image input unit 1 can supply a document image to the subsequent predetermined pixel block extraction unit 3 or the image shifting unit 6 correspondingly to the request.

The predetermined pixel block extraction unit 3 extracts a predetermined pixel block out of the document image of each page held in the image memory unit 2, and supplies the coordinate of the extracted predetermined pixel block to the difference extraction unit 5. The predetermined pixel block means the document component that appears commonly on each document image to be processed. For example, the page number, header, footer, or logotype may be used as the predetermined pixel block. One of these document components is assigned as the predetermined pixel block, and the predetermined pixel block is obtained by the layout analysis of the document image, or a rough region where the predetermined pixel block appears has been set previously as a specified coordinate region and the predetermined pixel block is extracted from the specified coordinate region. Furthermore, it is possible to utilize the reference position positioned by the reference position designation unit 4 when the predetermined pixel block is extracted. A detailed example of the method for extracting the predetermined pixel block will be described hereinafter.

The reference position designation unit 4 designates the coordinate to which the predetermined pixel block is to be shifted as the reference position. In detail, for example, the reference position designation unit 4 may have a user interface provided with a key board, a mouse, and a display. The reference position designation unit 4 acquires the position information in the document image given as the reference position from a user through a user interface, and supplies the coordinate value as the two-dimensional coordinate data to the difference extraction unit 5.

The difference extraction unit 5 calculates the difference between the coordinate value supplied from the predetermined pixel extraction unit 3 and the coordinate value supplied from the reference position designation unit 4, and supplies the difference value to the pixel shifting unit 6.

The image shifting unit 6 shifts the whole document image of the corresponding page held in the image memory unit 2 based on the difference value supplied from the difference extraction unit 5. Thereby, the location of the document image is corrected. The document image is held in the image memory unit 2 after the location correction in this example. At that time, the document image held before the location correction may be replaced with the document image obtained by the location correction. Otherwise, the document image obtained by the location correction may be supplied as an output.

Figure 3:
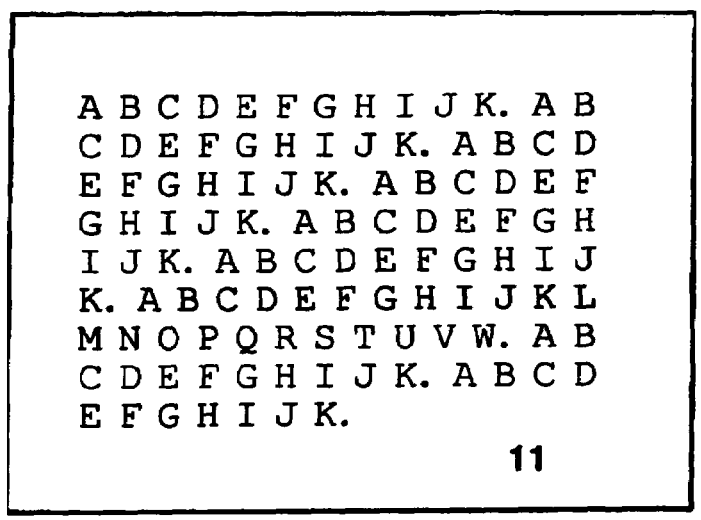
FIG. 3 is a diagram illustrating an exemplary document image after position correction.

Next, the outline of the operation performed in the first embodiment of the present invention will be described hereunder. FIG. 2A to FIG. 2C are explanatory diagrams illustrating a detailed example described in the first embodiment of the present invention, and FIG. 3 is an explanatory diagram of the detailed example of the document image obtained by the location correction. For example, in this example, the page number (portion of "11" in FIG. 2B) located at the lower right of the page as the predetermined pixel block of the document image shown in FIG. 2B is extracted and sifted to the reference position.

At first, the coordinate of the reference position where the predetermined pixel block is to be positioned is designated previously by use of the reference position designation unit 4. For example, it is assumed that a user designates the position that is marked with × in FIG. 2A as the reference position by use of the reference position designation unit 4. The coordinate of the designated reference position is supplied to the difference extraction unit 5.

After the designation of the reference position, for example, the image input unit 1 reads a paper document by a scanner or the like, or receives a document image having one or plural pages held previously in the form of bitmap format, and supplies the image document to the image memory unit 2. One example of the document image supplied to the image input unit 1 is shown in FIG. 2B. In this example, the image of the whole document content deviates upper left.

The predetermined pixel block extraction unit 3 extracts the predetermined pixel block out of the predetermined page of the document image held in the image memory unit 2, and supplies the coordinate of the extracted pixel block to the difference extraction unit 5. In this example, the page number on the document image is extracted as the predetermined pixel block as described hereinabove. In the example shown in FIG. 2B, the page number "11" located at the lower right position is extracted as the predetermined pixel block.

The difference extraction unit 5 calculates the difference between the coordinate value supplied from the predetermined pixel extraction unit 3 and the coordinate value supplied from the reference position designation unit 4, and supplies the difference value to the image shifting unit 6. The difference value (indicated with arrow) between the coordinate of the predetermined character string "11" that indicates the page number extracted by the predetermined pixel extraction unit 3 and the coordinate (shown with ×) of the reference position designated by the reference position designation unit 4 shown in FIG. 2A is calculated as shown in FIG. 2C. The position on the predetermined pixel block and the reference position that are used for calculation of the difference are arbitrary, for example, the position may be the center, upper left, or lower right of the predetermined pixel block.

The image sifting unit 6 shifts the predetermined page of the whole document image stored in the image memory unit 2 based on the difference value supplied from the difference extraction unit 5. As the result, the document image that deviates upper right as shown in FIG. 2B is shifted to the lower right by the difference value shown in FIG. 2C, and the document image as shown in FIG. 3 is obtained. The obtained document image that has been subjected to location correction is supplied as the output as it is or stored in the image memory unit 2 again.

A document image equivalent to one page is subjected to location correction processing completely as described hereinabove. After the image shifting unit has completed location correction processing of the document image, the image input unit 1 reads the next page of the image data and supplies it to the image memory 2. After that, the same processing is repeated successively until all the pages of the image data are shifted. Otherwise, the image input unit 1 supplies all the pages of the document image to the image memory unit 2 for storing at first, and the processing by the predetermined pixel block extraction unit 3 and the subsequent processing are repeated for respective pages of the document image. In this case, it is possible that the second page and the following pages of the document image are supplied from the image input unit 1 to the image memory unit 2 simultaneously with the processing by the predetermined pixel block extraction unit 3 and the subsequent processing.

The respective document images of all pages are subjected to the abovementioned processing to true up the location of the document images of all pages. The example in which the page number positioned at the lower right is extracted as the predetermined pixel block for location correction is described in the abovementioned detailed example, however, the example is by no means limited to this case, the case in which an arbitrary document component that is common for all pages is extracted as the predetermined component for location correction may be employed.

Figure 4A:
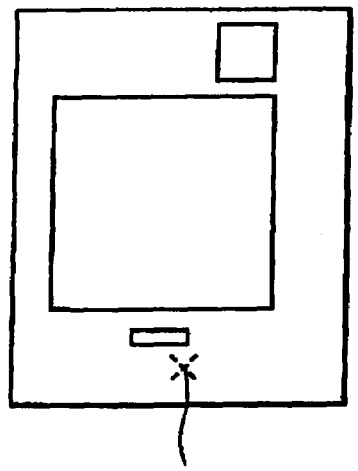
FIG. 4A and FIG. 4B are explanatory diagrams illustrating detailed exemplary extraction of a predetermined pixel block according to layout analysis performed by a predetermined pixel block extraction unit 3.
Figure 4B:
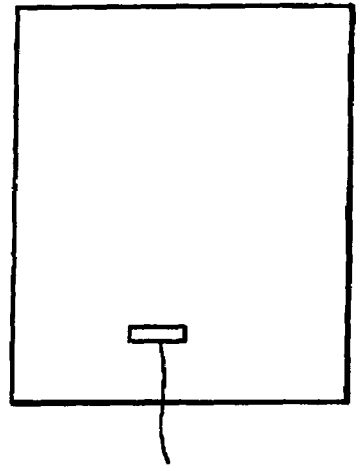

Next, the configuration and the operation of the predetermined pixel block extraction unit 3 will be further described. FIG. 4A and FIG. 4B are explanatory diagrams illustrating the detailed example of extraction of the predetermined pixel block by layout analysis in the predetermined pixel block extraction unit 3. As a method for extracting the predetermined pixel block in the predetermined pixel block extraction unit 3, a method has been known in which the layout of a whole page is analyzed and a pixel block located near the reference position is extracted as the predetermined pixel block. For example, the document image of one page is analyzed, and document components in the document are extracted as rectangular regions as shown in FIG. 4A with solid line. Herein, in the case where the position marked with broken line × in FIG. 4A is designated as the reference position by the reference position designation unit 4, the rectangular region located nearest to the reference position is extracted as the predetermined pixel block as shown in FIG. 4B. The configuration that is used for extracting the predetermined pixel block by layout analysis as described hereinabove is described hereunder.

Figure 6A:
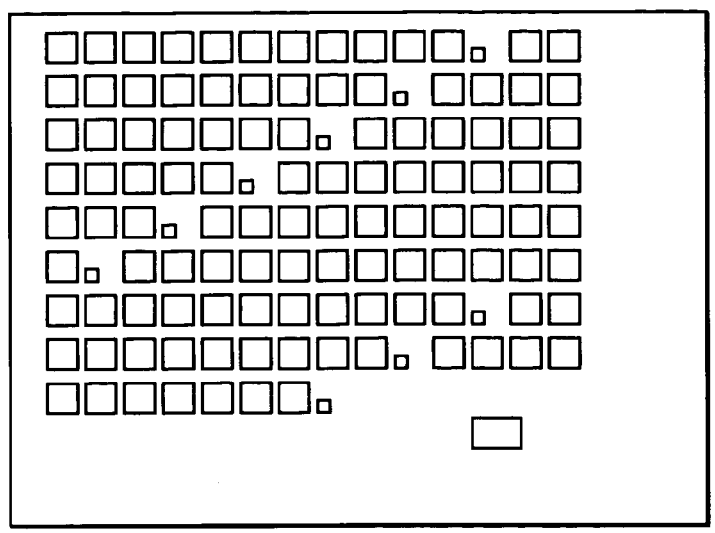
FIG. 6A to FIG. 6C are explanatory diagrams illustrating an exemplary detailed operation in an exemplary predetermined pixel block extraction unit 3.
Figure 6B:
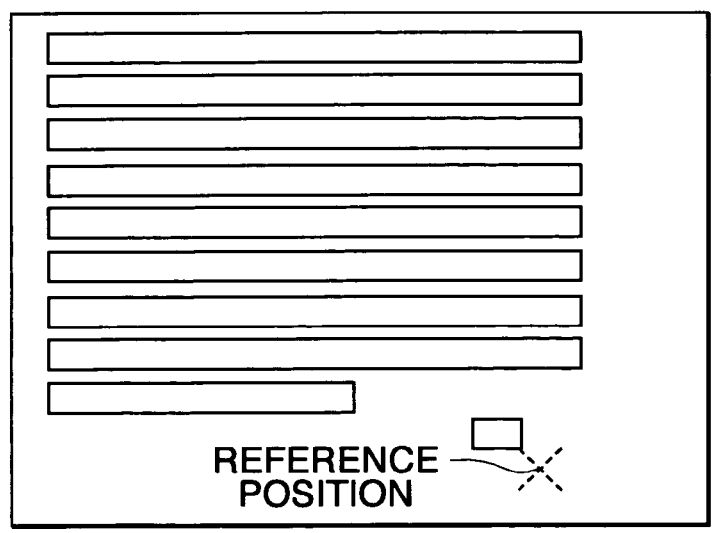
Figure 6C:
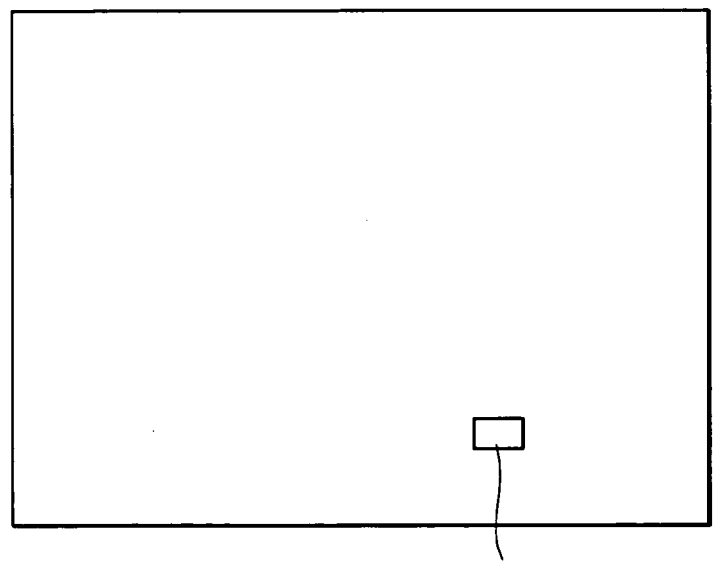

FIG. 5 is a block configuration diagram illustrating an example of the predetermined pixel block extraction unit 3, and FIG. 6A to FIG. 6C are explanatory diagrams of a detailed operation example of the predetermined pixel block extraction unit 3. In FIG. 5, 11 denotes a rectangular frame extraction unit, 12 denotes a character string direction designation unit, 13 denotes a connected rectangular frame generation unit, and 14 denotes a connected rectangular frame extraction unit. The rectangular frame extraction unit 11 extracts the region where black pixels are connected in the form of a group of coordinates of rectangular frames. For example, in the case where the document image, for example, shown in FIG. 2B is entered, the rectangular frame extraction unit 11 extracts a circumscribed rectangular frame of black pixels from the connection of black pixels in the document image, and as the result a rectangular frame as shown in FIG. 6A is obtained.

The character string direction designation unit 12 designates the direction of the character string. For example, in the case of the document image as shown in FIG. 2B, the character string direction may be designated as the horizontal. The character string direction designation unit 12 may be served as a user interface as in the case of the reference position designation unit 4. Otherwise, in the case where the information that indicates the character string direction is added to the input document image, the information may be used. As a matter of course, the character string direction may be determined previously or designated externally.

The connected rectangular frame generation unit 13 connects rectangular frames extracted by the rectangular frame extraction unit 11 in the direction of the character string designated by the character string direction designation unit 12 to generate a connected rectangular frame. For example, in the case where rectangular frames as shown in FIG. 6A are extracted by the rectangular frame extraction unit 11 and the horizontal direction is designated as the direction of the character string by the character string direction unit 12, the rectangular frames are connected in the horizontal direction, and the connected rectangular frames as shown in FIG. 6B are formed.

The connected rectangular frame extraction unit 14 extracts the connected rectangular frame corresponding to the predetermined pixel block out of the connected rectangular frames generated by the connected rectangular frame generation unit 13. For example, in the case where the coordinate of the reference position is received from the reference position designation unit 4, a method in which the connected rectangular frame located nearest to the reference position is extracted may be employed as the connected rectangular frame extraction method. For example, in the case where the position indicated with broken line × is designated as the reference position in FIG. 6B, the connected rectangular frame located nearest to the reference position is extracted as shown in FIG. 6C. The predetermined pixel block can be extracted as described hereinabove. The coordinate of the predetermined position of the connected rectangular frame (predetermined pixel block) shown in FIG. 6C is supplied to the difference extraction unit 5.

Figure 7:
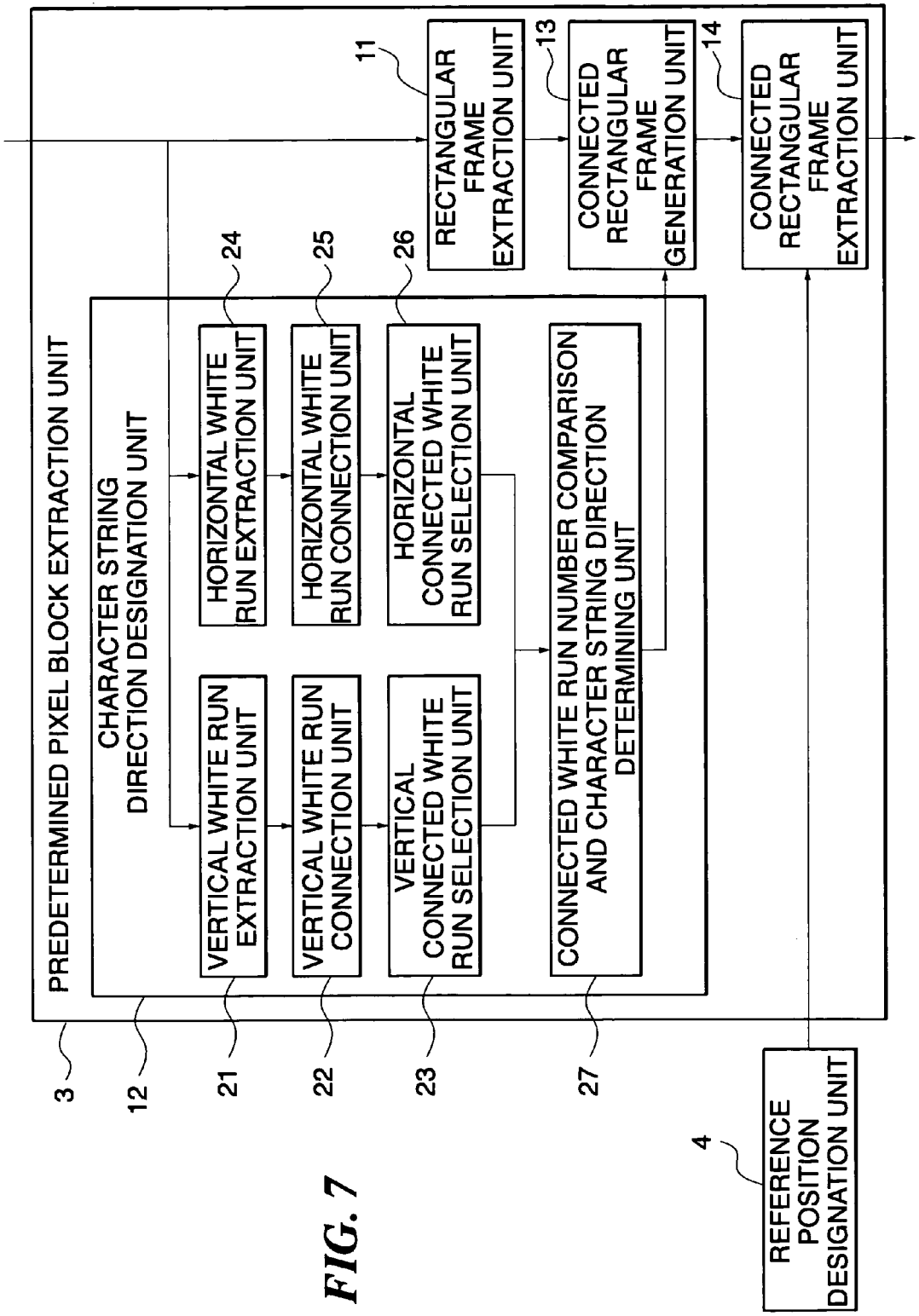
FIG. 7 is a block configuration diagram illustrating an exemplary character string direction designation unit 12.
Figure 8A:
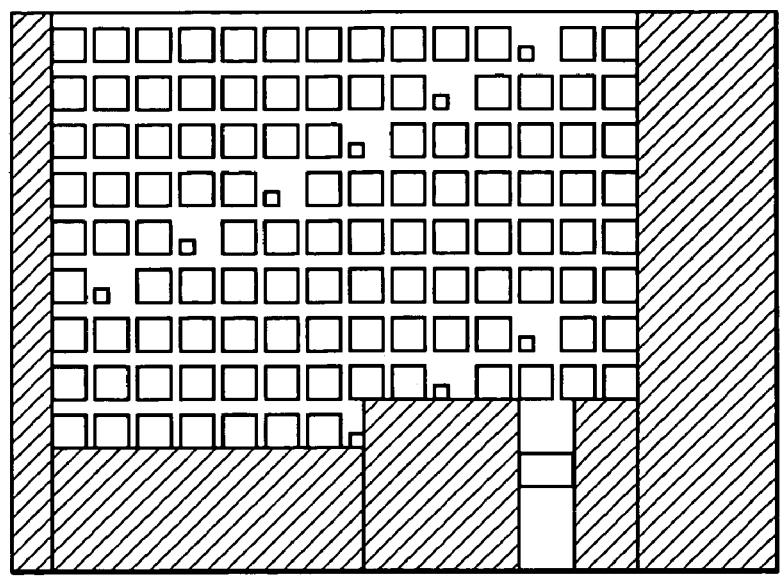
FIG. 8A and FIG. 8B are explanatory diagrams illustrating an exemplary detailed operation in an exemplary character string direction designation unit 12.
Figure 8B:
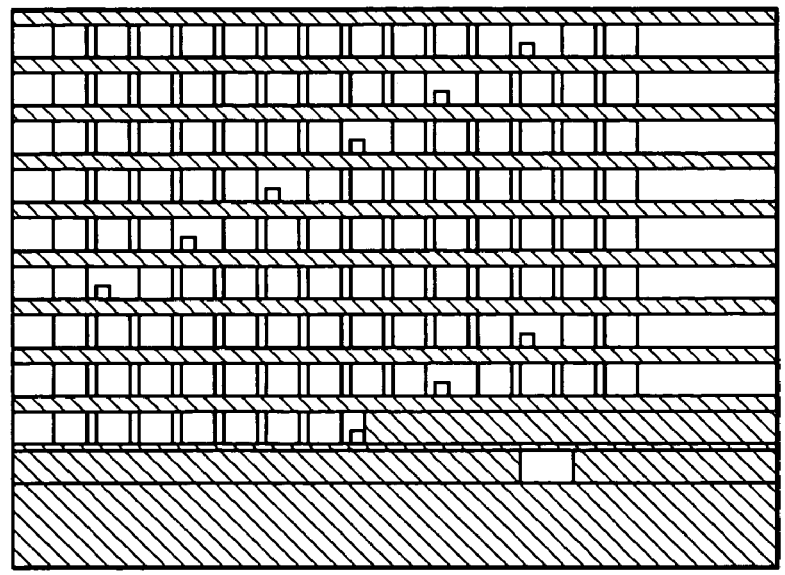

FIG. 7 is a block configuration diagram illustrating an example of the character string direction designation unit 12, and FIG. 8A and FIG. 8B are explanatory diagrams illustrating an exemplary detailed operation of the character string direction designation unit 12. The same components shown in FIG. 7 as those shown in FIG. 5 are given the same characters and the description is omitted. 21 denotes a vertical white run extraction unit, 22 denotes a vertical white run connection unit, 23 denotes a vertical connected white run selection unit, 24 denotes a horizontal white run extraction unit, 25 denotes a horizontal white run connection unit, 26 denotes a horizontal connected white run selection unit, and 27 denotes a connected white run number comparison and character string direction determining unit. The example in which the character string direction designation unit 12 is served as the user interface and a user designates the direction of the character string is shown in FIG. 5. The designation method is by no means limited to the method described in the abovementioned example shown in FIG. 5, but the character string direction can be detected by automatic analysis of the character string direction, and the configuration and the operation to be used in such a case are shown in FIG. 7 and FIGS. 8A and 8B respectively.

At first, a document image is scanned in the vertical direction and the horizontal direction, and white runs having at least a certain length is extracted by the vertical white run extraction unit 21 and the horizontal white run extraction unit 24. The vertical white run connection unit 22 connects adjacent white runs extracted by the vertical white run extraction unit 21. Similarly, the horizontal white run connection unit 25 connects adjacent white runs extracted by the horizontal white run extraction unit 24. FIG. 8A shows with hatching the white runs of the document image shown in FIG. 2B extracted by the vertical white run extraction unit 21 that are connected by the vertical white run connection unit 22. Similarly, FIG. 8B shows with hatching the white runs extracted by the horizontal white run extraction unit 24 that is connected by the horizontal white run connection unit 25.

After white runs are connected in the horizontal direction and the vertical direction as described hereinabove, the connected white run number comparison and character string direction determination unit 27 counts the number of connected white run regions (connected white run number) and compares between the vertical connected white run number and the horizontal connected white run number to thereby determine the character string direction of the document image. Generally, the horizontal connected white run number is larger for the horizontally written document while the vertical connected white run number is larger for the vertically written document. In the case of the exemplary document image as shown in FIG. 2B, the horizontal connected white run number is larger as understood from comparison between FIG. 8A and FIG. 8B, and the document image is regarded as the horizontally written document.

After the rectangular frame extraction unit 11 extracts the circumscribed rectangular frame, the connected rectangular frame generation unit 12 generates a connected rectangular frame as in the abovementioned case shown in FIG. 5 based on the character string direction supplied from the connected white run number comparison and character string direction determining unit 27 as described hereinabove. The connected rectangular frame extraction unit 13 extracts the predetermined pixel block and sends it out as the output. In the case of the exemplary document image shown in FIG. 2B, after the circumscribed rectangular frame is extracted by the rectangular frame extraction unit 11 as shown in FIG. 6A, the connected rectangular frame generation unit 12 generates the connected rectangular frame as shown in FIG. 6B based on the character string direction (in this example, horizontally written document) supplied from the connected white run number comparison and character string direction determining unit 27 as described hereinabove. For example, as shown in FIG. 6C, the connected rectangular frame located nearest to the reference position is extracted as the predetermined pixel block.

To prevent selection error in the case where there is no rectangular frame (pixel block) to be selected when the connected rectangular frame locating nearest to the reference position is selected, for example, the region or distance is restricted preferably.

Figure 9:
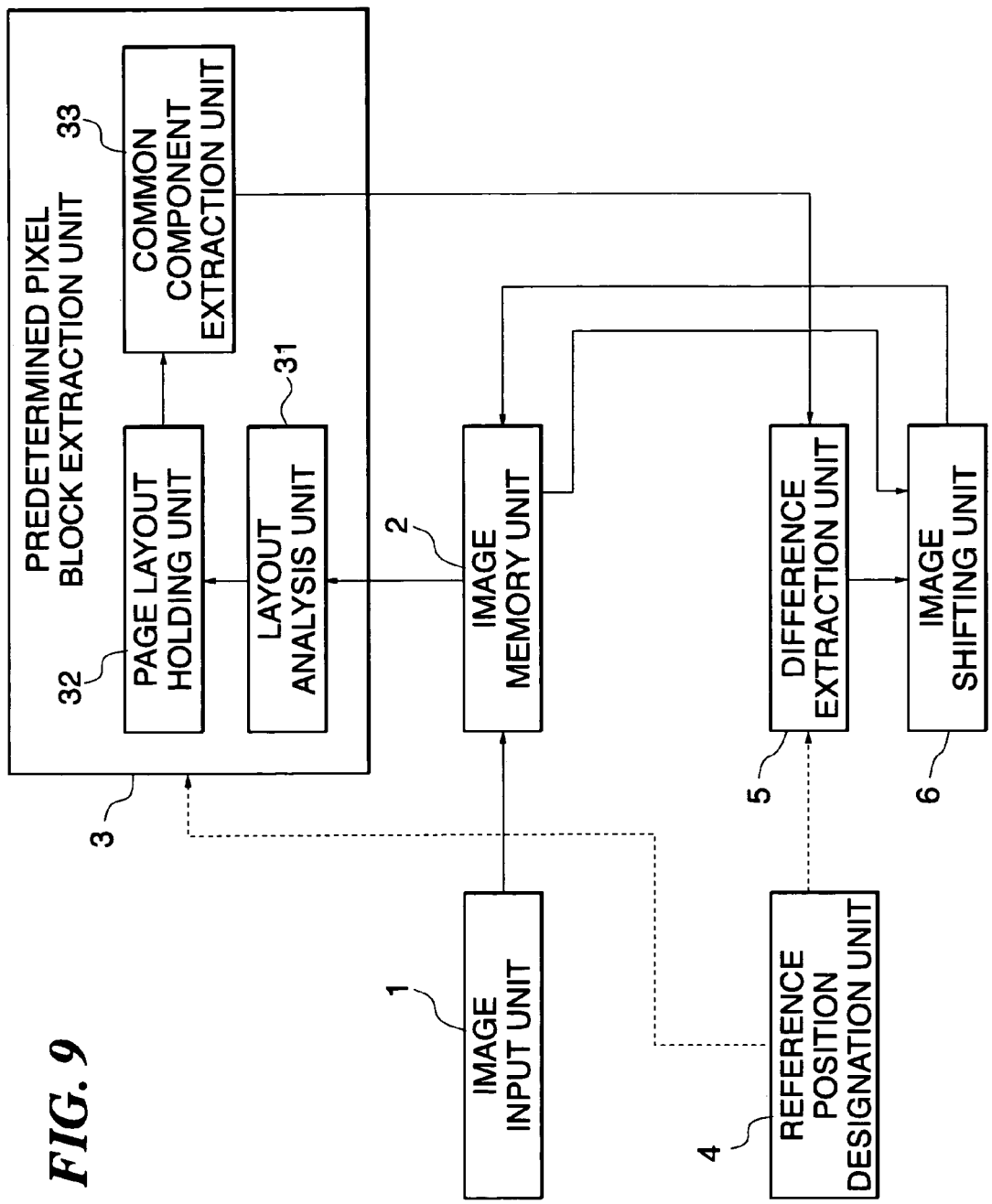
FIG. 9 is a block diagram illustrating the second embodiment of the present invention.

FIG. 9 is a block diagram illustrating the second embodiment of the present invention. The same components shown in FIG. 9 as shown in FIG. 1 are given the same characters, and the description is omitted. 31 denotes a layout analysis unit, 32 denotes a page layout holding unit, and 33 denotes a common component extraction unit. In the second embodiment, pixel blocks that exist commonly on respect document images of all pages are automatically detected, and the detected pixel blocks are trued up to the reference position as the predetermined pixel block. The predetermined pixel block extraction unit 3 of the second embodiment is provided with the layout analysis unit 31, the page layout holding unit 32, and the common component selection unit 33.

The layout analysis unit 31 analyzes the layout of the document image held in the image memory unit 2, and acquires the attribute (character, diagram, or graph) of the black pixel block of each region. The layout data acquired by the layout analysis unit 31 is held in the page layout holding unit 32 for every page.

The common component extraction unit 33 analyzes the layout information (coordinate value and attribute of the region) of every page held in the page layout holding unit 32, and extracts rectangular frames extracted from each page having respective coordinate values that are close to each other and having the same attribute. The extracted rectangular frame is regarded as the predetermined pixel block. In the case where plural rectangular frames are extracted, all extracted rectangular frames may be used, or one or plural rectangular frames selected from among all extracted rectangular frames may be used. When extracted rectangular frames are selected, for example, the selection condition such as small position error, small size dispersion of the rectangular frames, or location of the rectangular frame is set, and the rectangular frame may be selected according to the selection condition. In the example described hereinabove, the common component extraction unit 33 supplies the coordinate of the predetermined pixel block extracted as described hereinabove for respective document images of all pages to the difference extraction unit 5. Furthermore, for example, the reference position may be calculated by use of the average value or by means of statistical method based on the position of the predetermined pixel block in the document images of every page.

The difference extraction unit 5 calculates the difference value between the coordinate of the predetermined pixel block supplied from the common component extraction unit 33 and the reference position designated by the reference position designation unit 4. In the case where the common component extraction unit 33 calculates the reference position, the difference value between the reference position and the position of the predetermined pixel block of the document image of each page may be calculated by use of the calculated reference position. In this case, the reference position designation unit 4 is needless.

Figure 10A:
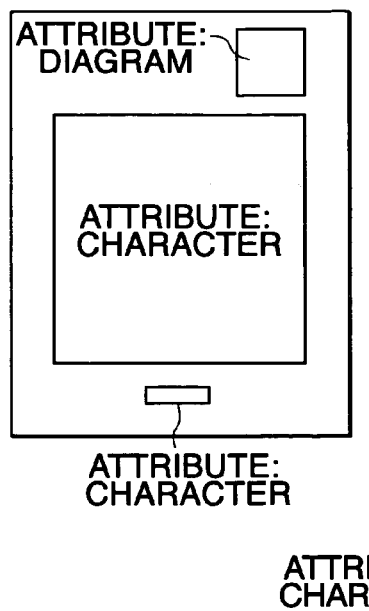
FIG. 10A to FIG. 10D are explanatory diagrams illustrating an exemplary detailed operation in the second embodiment of the present invention.

Next, the outline of one exemplary operation of the second embodiment of the present invention will be described with reference to a detailed example hereunder. FIG. 10A to FIG. 10D are explanatory diagrams illustrating an exemplary detailed operation of the second embodiment of the present invention. At first, the document image of one page is supplied from the image input unit 1 to the image memory unit 2 and the image memory unit 2 stores the document image, and the layout analysis unit 31 analyzes the layout of the document image, acquires the attribute (character, diagram, graph) of the pixel blocks of each region, and stores the attribute in the page layout holding unit 32. FIG. 10A shows a layout analysis result of the first page schematically. In this example, a diagram such as logotype mark appears at the upper right, a character region of the text appears at the center, and a character region of page number appears at the lower center.

Figure 10B:
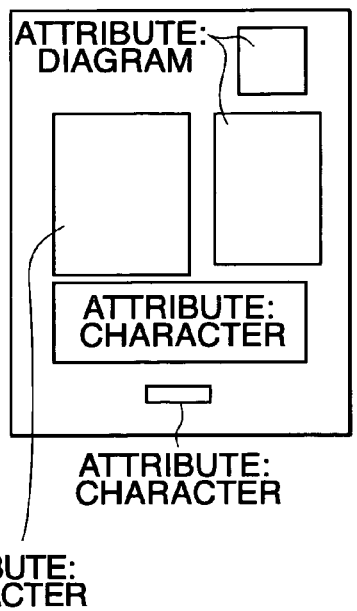

After the layout analysis of the document image of the first page is completed, the image input unit 1 supplies the document image of the second page to the image memory unit 2. The layout analysis unit 31 analyzes the layout of the document image held in the image memory unit 2 similarly, acquires the attribute of the pixel blocks, and stores the attribute in the page layout holding unit 32. FIG. 10B shows the layout analysis result of the second page schematically. In this example, a diagram such as logotype mark appears at the upper right, a diagram such as a graph appears at the center right, character regions of the text appear at the left side of the diagram and at the lower center, and a character region of page number appears at the lower center.

Figure 10C:
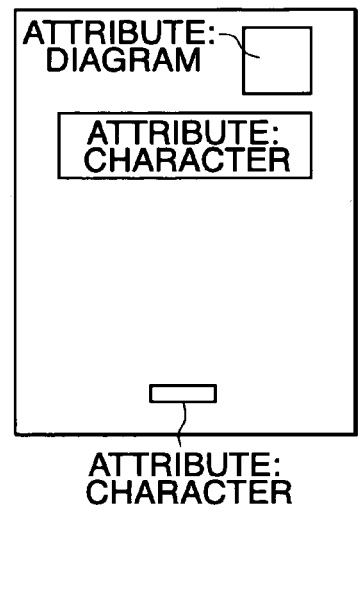

The layout analysis unit 31 analyzes the layout of the document images of following all pages similarly, and stores the analysis result in the page layout holding unit 32. FIG. 10C shows the layout analysis result of n-th page schematically, and a similar layout analysis result is obtained for other pages from the first to n-th pages.

Figure 10D:
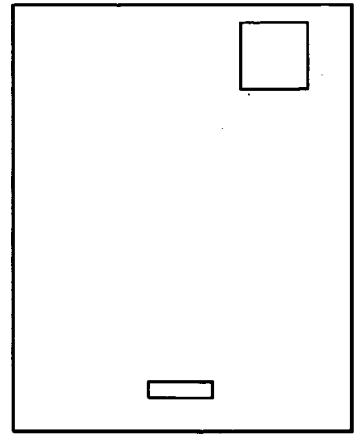

When the layout information of all the pages are stored in the page layout holding unit 32 as described hereinabove, the common component extraction unit 33 analyzes the layout information (coordinate value of region and attribute) of each page held in the page layout holding unit 32, and extracts the rectangular frame so that the difference between coordinate values of rectangular frames extracted from all pages is minimized and the attribute of these rectangular frames are the same. In the case where the layout analysis result as shown in FIG. 10A to FIG. 10C is obtained, the diagram located at the upper right and the character region located at the lower center are extracted as shown in FIG. 10D. The central region is not extracted because shapes of these regions are different between pages.

In the example shown in FIG. 10D, plural common rectangular frames are extracted. In such a case, one common rectangular frame is selected according to the selection condition that has been previously set. For example, the common rectangular frame involved in a small error between pages, or the common rectangular frame having the same size is selected. Otherwise, the common rectangular frame may be selected according to the location, namely the rectangular frame located at the upper side or the lower side, or according to the attribute of the rectangular frame (for example, diagram, character, or the like). Further, the common rectangular frame may be selected by use of a user interface by a user, or the rectangular frame located nearest to the reference position designated by the reference position designation unit 4 may be selected.

The common rectangular frame is extracted as described hereinabove or one rectangular frame is selected from among plural extracted rectangular frames if the plural rectangular frames are extracted, and the rectangular frame is regarded as the predetermined pixel block. The coordinates of the predetermined pixel blocks (rectangular frames) on the document images of all pages are supplied successively to the difference extraction unit 5.

The difference extraction unit 5 calculates the difference value between the coordinate of the predetermined pixel block supplied from the common component extraction unit 33 and the reference position designated by the reference position designation unit 4. Otherwise, a method may be employed in which the common component extraction unit 33 also calculates the reference position and calculates the difference value between the reference position and the coordinate of the predetermined pixel block supplied from the common component extraction unit 33 by use of the reference position calculated by the common component extraction unit 33. The difference value is supplied to the image shifting unit 6, and the image shifting unit 6 shifts the document image based on the difference value. As described hereinabove, the predetermined pixel block is set automatically, and the location of the document image is trued up to the reference position.

Figure 11:
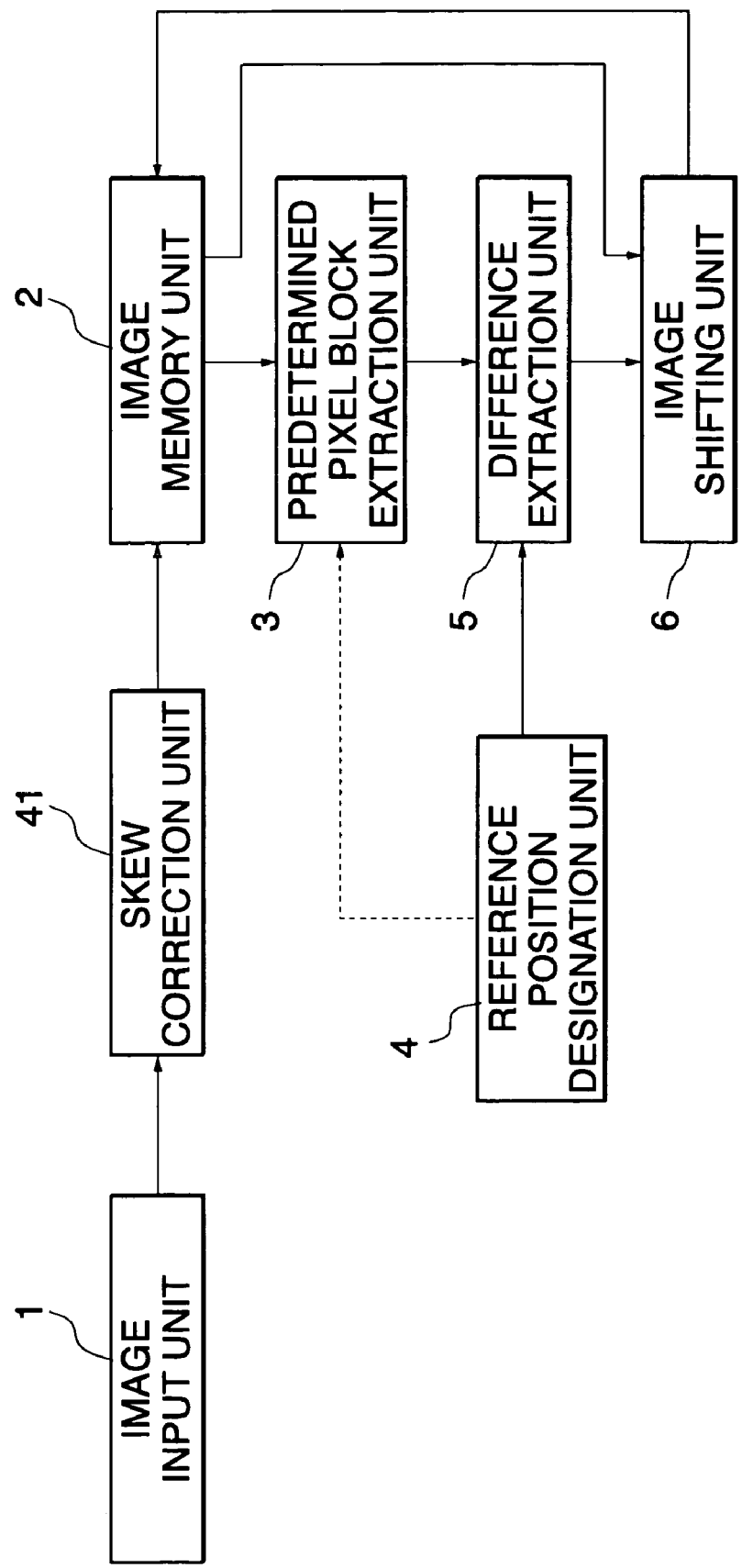
FIG. 11 is a block configuration diagram illustrating the third embodiment of the present invention.

FIG. 11 is a block configuration diagram illustrating the third embodiment of the present invention, and FIG. 12 is an explanatory diagram of an exemplary document image with skew. The same components shown in FIG. 11 as shown in FIG. 1 given the same characters, and the description is omitted. 41 denotes a skew correction unit. The input document image is located with deviation as shown in FIG. 2 and is skewed in some cases. The document image is skewed due to various causes. For example, a paper document is fed with skew to an image reading device or a paper document is set with skew when the document image is entered, or an image that has been formed with skew on a paper document is used. In the case of the third embodiment, such skew of the document image is also corrected.

The skew correction unit 41 detects the skew of a document image supplied from the image input unit 1, rotates the document image so that the skew is eliminated, and the document image is held in the image memory 2. The method for detecting the skew is arbitrary. For example, rectangular frames that surround the black pixel block are extracted from the document image, and only rectangular frames having the size that is supposed to be a character are selected. For example, the size that is supposed to be a character may be set to a size of approximately 6 dots to 80 dots in the case of the resolution of the input document image is 100 dpi. The center coordinates of rectangular frames selected as described hereinabove are calculated, and the skew angle may be calculated by Hough transform from these center coordinates. The document image may be rotated by the angle calculated as described hereinabove.

Figure 12A:
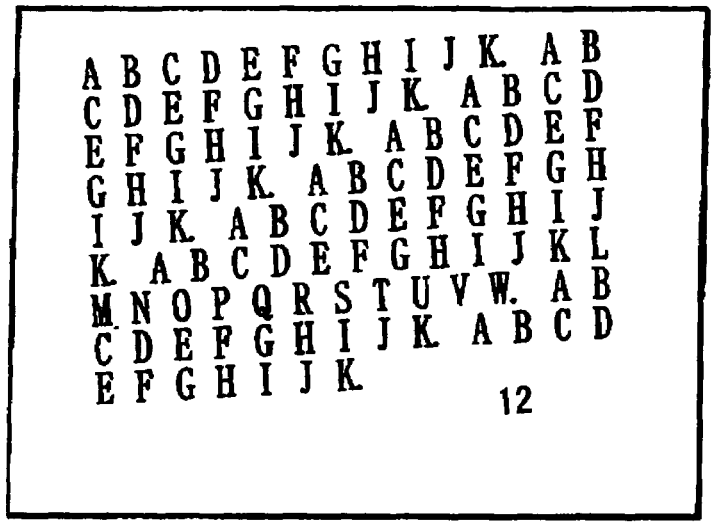
FIG. 12A and FIG. 12B are explanatory diagrams illustrating an exemplary document image with skew.
Figure 12B:
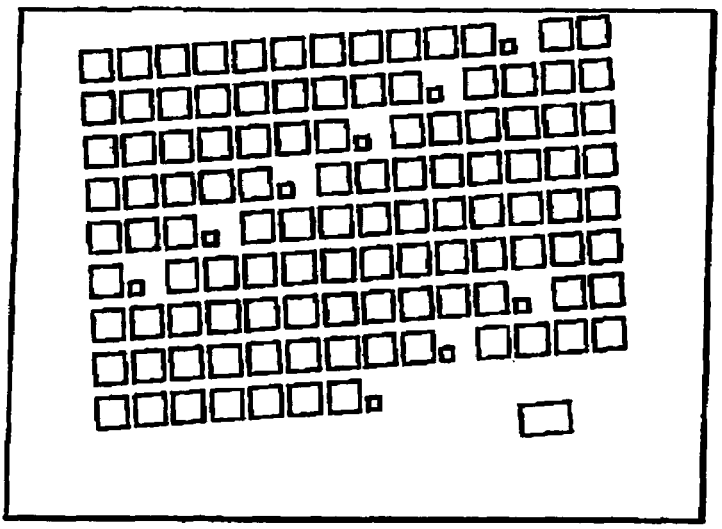

For example, in the case where the skewed document image as shown in FIG. 12A is entered, when rectangular frames that surround black pixel blocks are extracted and rectangular frames having the size that is supposed to be a character is selected, rectangular frames as shown in FIG. 12B are obtained. The skew angle is calculated by Hough transform from the center coordinates of the obtained rectangular frames, and the document image shown in FIG. 12A is rotated by the skew angle. As described hereinabove, even if a document image is skewed, the skew is corrected.

The process following the storing of the document image in the image memory unit 2 is the same as that in the first embodiment, and the description will be omitted. The skew correction unit 41 is used for the configuration of the first embodiment in the example shown in FIG. 11, but the first embodiment is not the only case, and the skew correction unit 41 may be used for the second embodiment.

The input document information is subjected to the skew correction processing before the input document information is held in the image memory unit 2 in the third embodiment, but not only the skew correction processing but also other various processing may be performed before the input document information is stored in the image memory unit 2. For example, in the case where there is an image that is turned upside down among document images on plural pages, the location cannot be corrected and the image cannot be stored. To solve the problem, whether the image is turned upside down or not is judged, and if the image is turned upside down, then the image is rotated 180 degrees. As a matter of course, two or more processing including other processing may be performed combinedly.

Figure 13:
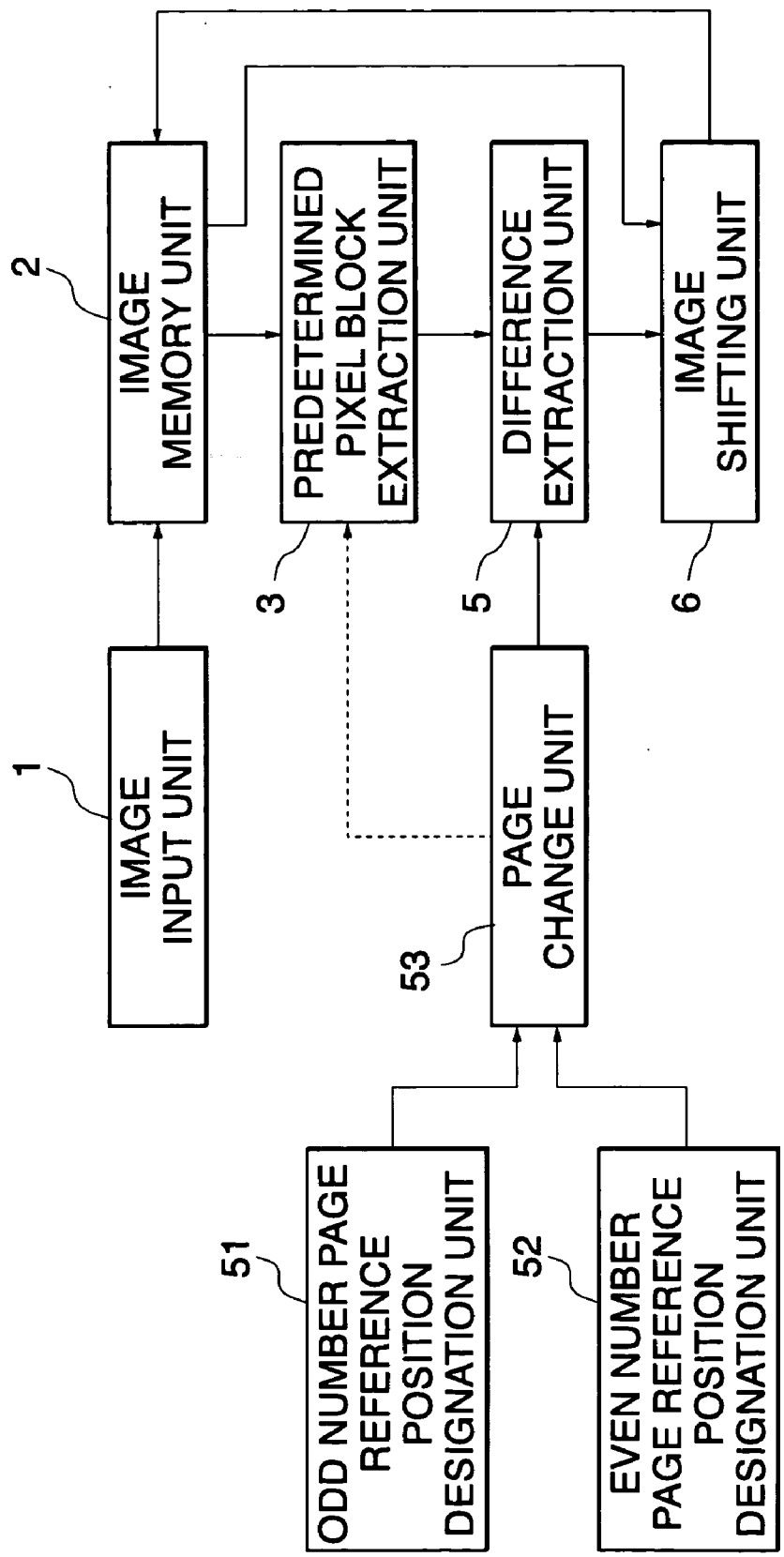
FIG. 13 is a block configuration diagram illustrating the fourth embodiment of the present invention.

FIG. 13 is a block configuration diagram illustrating the fourth embodiment of the present invention, and FIG. 14 is an explanatory diagram for illustrating an exemplary document having different layouts between odd number pages and even number pages. The same components shown in FIG. 13 as shown in FIG. 1 are given the same characters, and the description is omitted. 51 denotes an odd number page reference position designation unit, and 52 denotes an even number page reference position designation unit, and 53 denotes a page change unit. The spread document is entered on each page depending on the input document image. In the case of such a spread document, the layout is sometimes different between odd number pages and even number pages. For example, the page number, header, footer, and logotype are located at mirror symmetrical positions on right and left. For example, in an example shown in FIG. 14, the page number is located at the lower left on the even number page and located at the lower right on the odd number page. When such a document image is entered, the location of one of the odd number page and even number page deviates very far or positioning is impossible due to no extraction of the predetermined pixel block if only one reference position is designated. In the fourth embodiment, respective reference positions are designated for odd number pages and even number pages to thereby solve the abovementioned problem.

The odd number page reference position designation unit 51 designates the reference position of odd number pages. On the other hand, the even number page reference position designation unit 52 designates the reference position of even number pages. The odd number page reference position designation unit 51 and the even number page reference position designation unit 52 may be configured by use of the same user interface.

Depending on whether the document image subject to position correction is an odd number page or an even number page, the page change unit 53 selects any one of the reference position designated by the odd number page reference position designation unit 51 and the reference position designated by the even number page reference position designation unit 52, and supplied the selected reference position to the difference extraction unit 5.

The operation of the components other than abovementioned components is the same as those described in the first embodiment. In detail, the difference extraction unit 5 calculates the difference value between the reference position supplied from the page change unit 53 and the position of the predetermined pixel block extracted by the predetermined pixel block extraction unit 3, and the image shifting unit 6 shifts the document image by use of the difference value.

In the case where the predetermined pixel block is extracted by use of the designated reference position by the predetermined pixel block extraction unit 3, the predetermined pixel block may be extracted by use of the reference position supplied from the page change unit 53. By performing the abovementioned operation, the predetermined pixel blocks located at the position different between odd pages and even pages are extracted correctly.

An exemplary configuration in which respective reference positions are designated for odd number pages and even number pages in the configuration of the first embodiment is described in FIG. 13. However, the first embodiment is not the only example, and the configuration in which the reference position designation unit 4 is used in, for example, the second embodiment may be employed. In the case of the second embodiment, when the predetermined pixel block extraction unit 3 specifies a predetermined pixel block, the layout information is separated into the layout information of odd number pages and the layout information of even number pages, and the respective predetermined pixel blocks are specified preferably. As a matter of course, the fourth embodiment can be combined with the third embodiment.

Figure 15:
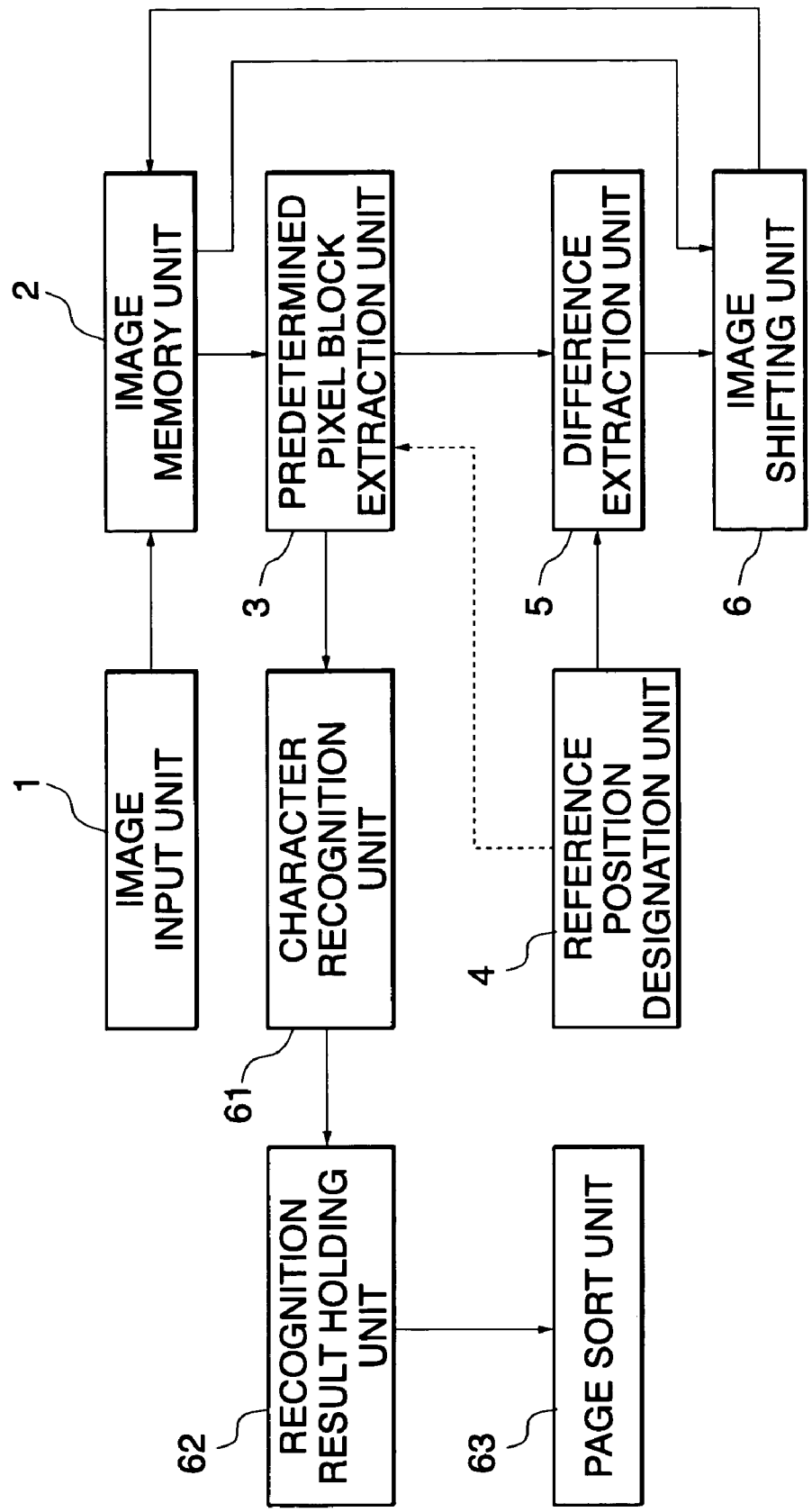
FIG. 15 is a block configuration diagram illustrating the fifth embodiment of the present invention.

FIG. 15 is a block configuration diagram illustrating the fifth embodiment of the present invention, and FIG. 16A and FIG. 16B are explanatory diagrams illustrating an exemplary page sorting. The same components shown in FIG. 15 as shown in FIG. 1 given the same characters, and the description is omitted. 61 denotes a character recognition unit, 62 denotes a recognition result holding unit, and 63 denotes a page sort unit. Depending on the input document image, the page order can be different from the input order. For example, in the case where paper documents are charged in the disordered page order to an image reading device, the page order of input document images is also disordered. In such a case, for example, if the character region where the page number appears as the predetermined pixel block is used, the extracted predetermined pixel block is subjected to character recognition to thereby indicate the page number. The page order of input document images can be rearranged by use of the page number. The fifth embodiment shows an example for implementing rearrangement of the page order as described hereinabove.

The character recognition unit 61 subjects the image of the character region where the predetermined pixel block extracted by the predetermined pixel block extraction unit 3, namely the page number, and acquires the page number. The recognition result holding unit 62 holds the page number recognized by the character recognition unit 61 for every document image of all pages. The page sort unit 63 refers the page number held in the recognition result holding unit 62, and rearranges the order of document images of the pages in the image memory unit 2 so that, for example, the page number is arranged in ascending order. At that time, the rearrangement is carried out by shifting the document images themselves in the image memory unit 2, or the input order index may be rearranged.

Alternatively, in the case where a file name list is given to the image input unit 1 and the image input unit 1 reads the document image from a file for input, the page number recognized by the character recognition unit 61 is stored previously in the recognition result holding unit 62 correlatively to the file name used when the image input unit reads the document image, and the page order may be rearranged by the page sort unit 63. FIG. 16A and FIG. 16B show such an example, the page number recognized by the character recognition unit 61 correlated to the file name is stored in the recognition result holding unit 62 as shown in FIG. 16A. The page sort unit 63 rearranges the recognition result stored in the recognition results holding unit 62 based on the recognition result according to the page number, and obtains the rearranged file name list as shown in FIG. 16B. The rearranged file name list may be stored in the image memory unit 2 or may be supplied to the outside as an output. Thereby, even if the page order is not ascending order, the page number is recognized based on the predetermined pixel block extracted for position correction, and the page order is rearranged. It is also possible that only the recognition obtained by the character recognition unit 61 is held in the recognition result holding unit 62, the file name list is acquired by the page sort unit 63, and the file name is rearranged according to the character recognition result held in the recognition result holding unit 62.

An exemplary operation of the fifth embodiment of the present invention will be described briefly hereunder. It is assumed for description herein that the file name list of the document image to be processed is given. The image input unit 1 reads the document images of pages based on the given file name list, and supplies the document images to the image memory unit 2. The predetermined pixel block extraction unit 3 extracts the predetermined pixel block from among the document image, namely the pixel block including the character string indicating the page number or page order in this case. The operation of the reference position designation unit 4, the difference extraction unit 5, and the image shifting unit 6 is the same as that described in the first embodiment, that is, the location of the document image of each page is corrected according to the difference value between the location of the extracted predetermined pixel block and the reference position.

On the other hand, the predetermined pixel block extracted by the predetermined pixel block extraction unit 3 is supplied to the character recognition unit 61. The character recognition unit 61 subjects the input predetermined pixel block to character recognition processing, and supplies the recognition result to the recognition result holding unit 62. The recognition result holding unit 62 holds the file name of the page that is being processed and the character recognition result in the form of a pair.

After the image shifting unit completes recognition processing of position correction processing of the document image and recognition processing of the page number of one page, the image input unit 1 reads the document image of the next page and supplies it to the image memory unit 2. Following the next page, document images of all the residual pages are successively subjected to position correction processing and page number recognition processing in the order.

After the document image of the final page has been subjected to position correction processing and page number recognition processing completely, the page sort unit 63 sorts the file name in the code order (order of page number) of the character recognition result held in the recognition result holding unit 62, and rearranges the order. The given file names can be arranged in the correct page number order as described hereinabove.

The exemplary operation is described for the case in which the file name list of the document images is given to the image input unit 1 is described in the above, but the operation may be applied to the case in which, for example, the document image is read successively from the image input unit or the document image is supplied successively through a line. In such a case, the identification information such as a series of number or file name is given to each document image of one input page, and the identification information may be rearranged. Otherwise, the identification information may be given again in the rearranged order.

Furthermore, the example in which the character recognition unit 61, the recognition results holding unit 62, and the page sort unit 63 are added to the configuration of the first embodiment is described in FIG. 15, and the first embodiment is not the only case, but the fifth embodiment can be applied also to the second embodiment. In this case, the common component extraction unit 33 extracts the pixel block that indicates the page order such as page number as the predetermined pixel block, and then transfers the image of the extracted predetermined pixel block to the character recognition unit 61. Furthermore, it is possible to combine the third and fourth embodiments properly.

Figure 17:
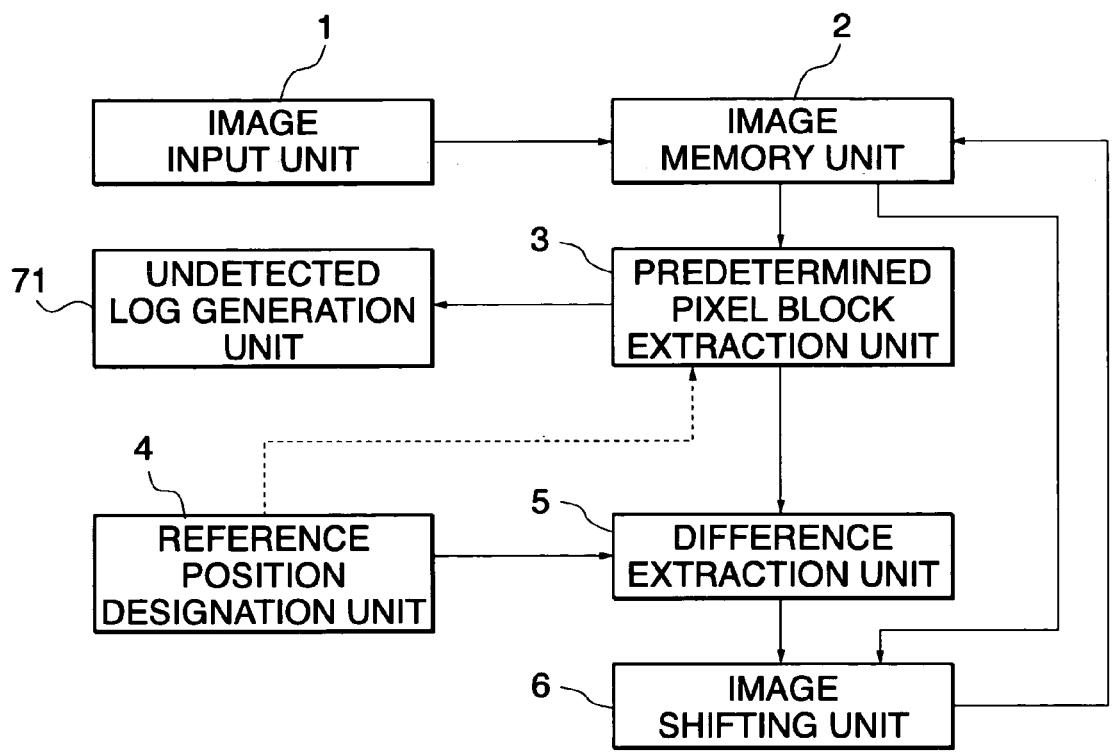
FIG. 17 is a block configuration diagram illustrating the sixth embodiment of the present invention.

FIG. 17 is a block configuration diagram illustrating the sixth embodiment of the present invention. The same components shown in FIG. 17 as shown in FIG. 1 are given the same characters, and the description is omitted. 71 denotes an undetected log generation unit. The predetermined pixel block extraction unit 3 extracts the predetermined pixel block from the document image as described hereinbefore. However, in the case where there is no predetermined pixel block in the document image and the predetermined pixel block cannot be extracted, the predetermined pixel block extraction unit 3 supplies the information of the document image of this page to the undetected log generation unit 71. For example, in the case where the file name list of the document image is not given to the image input unit 1, the file name corresponding to the document image of this page may be supplied to the undetected log generation unit 71. As a matter of course, any information other than the file name may be used as long as the information is used to specify the document image of the page from which the predetermined pixel block has not been extracted.

The undetected log generation unit 71 records the information of the document image supplied when the predetermined pixel block extraction unit 3 cannot extract the predetermined pixel block. Because the log of the document image of the page having no extracted predetermined pixel block is recorded, a user can correct the location of only the document image of the page that has not been subject to position correction manually or by use of another pixel block with reference to the log after a series of position correction processing is completed. Otherwise, it is possible to configure a system so that the log that has been generated by the undetected log generation unit 71 is referred to another user support system that supports the user to correct the location of the document image of the page that has not been corrected automatically.

An exemplary configuration in which the first embodiment is used is described in FIG. 17, but the first embodiment is not the only case, and the undetected log generation unit 71 may be used for the second embodiment. However, in this case, if the common rectangular frame that appears on all the pages cannot be found when the common component extraction unit 33 extracts a common rectangular frame, the rectangular frame that can be found on more pages is extracted as the predetermined pixel block, and the information of document images of pages on which this rectangular frame cannot be found is recorded in the undetected log generation unit 71. Furthermore, it is possible to configure a system by combining the sixth embodiment with the abovementioned third or fifth embodiment.

Figure 18:
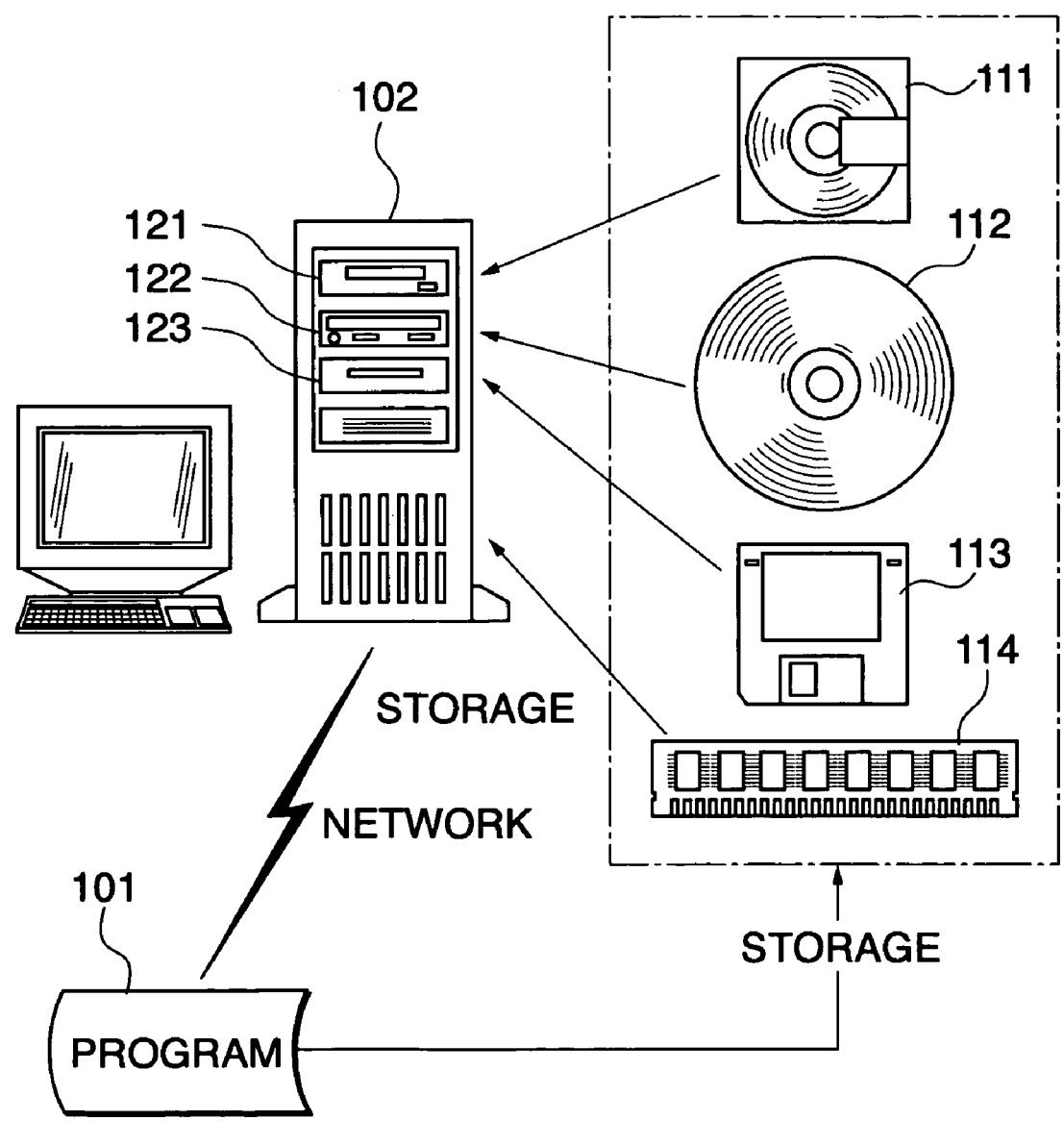
FIG. 18 is an explanatory diagram illustrating an exemplary memory medium in which a computer program is stored in the case where the function of the document image processing device or the document image processing method of the present invention is implemented by use of the computer program.

FIG. 18 is an explanatory diagram of an exemplary memory medium in which a computer program is stored in the case where the function of the document image processing device or document image processing method of the present invention is implemented by use of the computer program. In FIG. 18, 101 denotes a program, 102 denotes a computer, 111 denotes a magneto-optical disk device, 112 denotes an optical disk, 113 denotes a magnetic disk, 114 denotes a memory, 121 denotes an optical disk device, and 123 denotes a magnetic disk device.

The function of the configuration shown in respective embodiments of the present invention can be implemented by means of the program 101 that is executable by use of a computer. In this case, it is possible that the program 101 and data to be used by the program is stored in a computer-readable memory medium. The memory medium means a memory medium that gives magnetic, optical, or electrical energy change corresponding to the description content of the program to a reading device of the hardware resource of a computer and transmits the description content of the program to the reading device in the signal format corresponding to the change. Examples include, for example, the magneto-optical disk 111, optical disk 112, magnetic disk 113, and memory 114. As a matter of course, the memory medium is by no means limited to the potable type memory medium.

The program 101 is stored in a memory medium, the memory medium is mounted on, for example, a magneto-optical disk device 121, an optical disk device 122, a magnetic disk device 123, or a memory slot not shown in the drawing of the computer 102, and the program 101 is read out from the computer 102 and the function of the configuration described for respective embodiments of the present invention is executed. Otherwise, a memory medium is mounted on the computer previously, the program 101 is transferred to the computer 102 through, for example, a network, and the program 101 is stored in the memory medium and executed.

As it is obvious from the above description, according to the present invention, the location of document images of an arbitrary format having a common document component can be corrected. In the case where the location cannot be corrected, the log is recorded, and the location of the document image that has not been corrected can be easily corrected later manually.

The entire disclosure of Japanese Patent Application No. 2000-241492 filed on Aug. 9, 2000 including specification, claims, drawings and abstract is incorporated herein by reference in its entirety.

What is claimed is:

1. A document image processing device, comprising:
   an image memory part that holds an input document image per each page;
   a predetermined pixel block extraction part that analyzes a layout of the input document image in plural pages stored in the image memory part, determines at least one pixel block in the input image, and extracts a predetermined pixel block that appears commonly on at least some pages from a plurality of the at least one pixel block; and
   an image correction part that corrects a location of the whole input document image so that a position of the predetermined pixel block extracted by the predetermined pixel block extraction part is based on the reference position or the position of a reference pixel block in a document image.

2. The document image processing device according to claim 1, further comprising:
   a reference position designation part that causes a user to designate the reference position or the position of the reference pixel block in the document image,
   wherein the image correction part corrects the location of the whole input document image so that the position of the predetermined pixel block extracted by the predetermined pixel block extraction part is based on the reference position or the position of the reference pixel block in the document image designated by the reference position designation part.

3. The document image processing device according to claim 1, further comprising:
   the predetermined pixel block includes the at least one pixel block appearing at a similar position in a document image of each page which are approximately the same from each other, wherein the predetermined pixel block extraction part regards the approximately the same pixel block as a predetermined pixel block and determines the reference position.

4. The document image processing device according to claim 1, further comprising:

a reference position designation part that causes a user to designate the reference position or the position of the reference pixel block in the document image, wherein if there is the at least one pixel block appearing at a similar position in the document image of each page, the predetermined pixel block extraction part regards this pixel block as the predetermined pixel block, and the image correction part corrects a location of the whole input document image so that a position of the predetermined pixel block extracted by the predetermined pixel block extraction part is based on the reference position or the position of the reference pixel block designated by the reference position designation part.

5. The document image processing device according to claim 1, wherein the predetermined pixel block extraction part comprises a rectangular frame extraction part that extracts pixel block rectangular frames from the document image, a character string direction designation part that specifies a character string direction of the document image, a connected rectangular frame generation part that connects the rectangular frames in the direction designated by the character string direction designation part, and a connected rectangular frame extraction part that extracts the connected rectangular frame located nearest to the reference position or the position of the reference pixel block.

6. The document image processing device according to claim 5, wherein the character string direction designation part comprises a user interface that causes a user to designate the character string direction.

7. The document image processing device according to claim 5, wherein the character string direction designation part comprises a document layout analysis part that specifies the character string direction by analyzing the layout of a document image.

8. The document image processing device according to claim 7, wherein the document layout analysis part extracts runs of white pixels to be a background of the document image in both vertical and horizontal directions, connects adjacent runs of white pixels having a value equal to or larger than a predetermined threshold value to form a rectangular frame of a white pixel region in both vertical and horizontal directions, extracts rectangular frames having a width equal to or larger than a predetermined value from the rectangular frames in both vertical and horizontal directions, compares between the number of rectangular frames extracted in the vertical direction and the number of rectangular frames extracted in the horizontal direction, and determines the direction of the larger number as the character string direction of the document.

9. The document image processing device according to claim 1, further comprising an undetected log generation part that records information of the document image from which the predetermined pixel block extraction part cannot extract the predetermined pixel block.

10. The document image processing device according to claim 1, wherein the reference position designation part comprises an odd number page reference position designation part that designates the reference position or the position of the reference pixel block in odd number pages, an even number page reference position designation part that designates the reference position or the position of the reference pixel block in even number pages, and a page switching part that switches between outputs from the odd number page reference position designation part and the even number page reference position designation part depending on whether the page number is even or odd, thus making it possible to set respective separate extraction regions for the odd number page and the even number page.

11. The document image processing device according to claim 3, wherein, if the approximately the same pixel block is found at a similar position in the document image on odd number pages, the predetermined pixel block extraction part regards the pixel block as the predetermined pixel block on odd number pages, and if the approximately the same pixel block is found at a similar position in the document image on even number pages, regards the pixel block as the predetermined pixel block on even number pages.

12. The document image processing device according to claim 1, further comprising a skew correction part that corrects skew of the input document image.

13. The document image processing device according to claim 12, wherein the skew correction part subjects a center coordinate of a rectangular frame of pixel blocks to Hough transform to detect a skew angle.

14. The document image processing device according to claim 1, wherein the predetermined pixel block corresponds to a page number image, the document image processing device further comprising:
    a character recognition part that recognizes a character in an image; and
    a sort part that sorts the pages in the page number order after the image correction part corrects the location of the whole input document image and the character recognition part recognizes the page number character in the page number image.

15. A document image processing method, comprising:
    causing a user to designate in advance a reference position or a position of a reference pixel block;
    analyzing a layout of an input document image in plural pages to be processed;
    determining at least one pixel block in the input image;
    extracting a predetermined pixel block commonly appearing at least in some pages from a plurality of the at least one pixel block; and
    correcting a location of the whole input document image so that a position of the extracted predetermined pixel block is based on the reference position or the position of the reference pixel block.

16. A document image processing method, comprising:
    analyzing a layout of an input document image in plural pages to be processed;
    determining at least one pixel block in the input image;
    if the at least one pixel block in the input document image in each page are approximately the same from each other and appears at a similar position in each page, deciding the approximately the same pixel block as a predetermined pixel block and determining a reference position designated by a user; and
    correcting a location of the whole input document image so that a position of the predetermined pixel block appearing in the input document image in each page is based on the reference position.

17. A document image processing method, comprising:
    causing a user to designate in advance a reference position;
    analyzing a layout of an input document image in plural pages to be processed;
    determining at least one pixel block in the input image;
    if the at least one pixel block in the input document image in each page are approximately the same from each other and appears at a similar position in each page, deciding the approximately same pixel block as a predetermined pixel block; and correcting a location of the whole input document image so that a position of the predetermined pixel block appearing in the input document image in each page is based on the reference position.

18. The document image processing method according to claim 15, wherein if the predetermined pixel block cannot be extracted from the input document image, information of the document image is recorded.

19. A memory medium readable by a computer, the medium storing a program of instructions executable by the computer to perform a function comprising:

receiving a reference position or a position of a reference pixel block designated in advance by a user;

analyzing a layout of an input document image in plural pages to be processed;

determining at least one pixel block in the input image;

extracting a predetermined pixel block commonly appearing at least in some pages from a plurality of the at least one pixel block; and correcting a location of the whole input document image so that a position of the extracted predetermined pixel block is based on the reference position or the position of the reference pixel block.

20. A memory medium readable by a computer, the medium storing a program of instructions executable by the computer to perform a function comprising:

analyzing a layout of an input document image in plural pages to be processed;

determining at least one pixel block in the input image;

if the at least one pixel block in the input document image in each page are approximately the same from each other and appears at a similar position in each page, deciding the approximately the same pixel block as a predetermined pixel block; and correcting a location of the whole input document image so that a position of the predetermined pixel block appearing in the input document image in each page is based on a reference position designated by a user.

21. A memory medium readable by a computer, the medium storing a program of instructions executable by the computer to perform a function comprising:

receiving a reference position designated in advance by a user;

analyzing a layout of an input document image in plural pages to be processed;

determining at least one pixel block in the input image;

if the at least one pixel block in the input document image in each page are approximately the same from each other and appears at a similar position in each page, deciding the approximately the same pixel block as a predetermined pixel block; and correcting a location of the whole input document image so that a position of the predetermined pixel block appearing in the input document image in each page is based on a reference position.

22. The memory medium according to claim 19, wherein, if the predetermined pixel block cannot be extracted from a document image, information of the document image is recorded.

23. The document image processing device according to claim 1, wherein the position of the predetermined pixel block extracted by the predetermined pixel block extraction part is based on the reference position or the position of the reference pixel block in the document image.

* * * * *